(12) United States Patent
Kim

(10) Patent No.: US 11,912,335 B2
(45) Date of Patent: Feb. 27, 2024

(54) LANE KEEPING CONTROL APPARATUS, VEHICLE SYSTEM INCLUDING THE SAME, AND METHOD THEREOF

(71) Applicants:Hyundai Motor Company, Seoul (KR); Kia Corporation, Seoul (KR)

(72) Inventor: Seung Hyun Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 227 days.

(21) Appl. No.: 17/515,935

(22) Filed: Nov. 1, 2021

(65) Prior Publication Data
US 2022/0340200 A1    Oct. 27, 2022

(30) Foreign Application Priority Data

Apr. 23, 2021 (KR) .................. 10-2021-0053330

(51) Int. Cl.
*B62D 15/02* (2006.01)
*B60W 30/12* (2020.01)

(52) U.S. Cl.
CPC .......... *B62D 15/025* (2013.01); *B60W 30/12* (2013.01); *B60W 2520/14* (2013.01)

(58) Field of Classification Search
CPC ..... B62D 15/025; B62D 6/003; B60W 30/12; B60W 2552/30; B60W 40/114; B60W 2050/0008
See application file for complete search history.

(56) References Cited

U.S. PATENT DOCUMENTS

| 2011/0015850 | A1* | 1/2011 | Tange ................. B60T 8/17557 701/116 |
| 2013/0190984 | A1* | 7/2013 | Kawai ..................... B62D 6/00 701/41 |
| 2020/0023884 | A1* | 1/2020 | Mizoo ................... B60W 30/16 |
| 2021/0107481 | A1* | 4/2021 | Fukuda ........... B60W 30/18109 |
| 2021/0129838 | A1* | 5/2021 | Hultén ................ B62D 15/025 |

FOREIGN PATENT DOCUMENTS

KR    20140075218 A    6/2014

* cited by examiner

*Primary Examiner* — Jeff A Burke
*Assistant Examiner* — Jerrod Irvin Davis
(74) *Attorney, Agent, or Firm* — MORGAN, LEWIS & BOCKIUS LLP

(57) ABSTRACT

A lane keeping control apparatus, a vehicle system including the same, and a method thereof, may include a processor that generates a target path based on line information, upon lane keeping control of the vehicle, determines whether the vehicle arrives adjacent to the target path, determines a feedback compensation distance in a direction opposite to a current steering direction of the vehicle based on a yaw rate of the vehicle, when the vehicle arrives adjacent to the target path, and performs steering control of the vehicle based on the feedback compensation distance and a storage storing data and an algorithm run by the processor.

20 Claims, 10 Drawing Sheets

LANE KEEPING CONTROL APPARATUS, VEHICLE SYSTEM INCLUDING THE SAME, AND METHOD THEREOF

CROSS-REFERENCE TO RELATED APPLICATION

The present application claims priority to Korean Patent Application No. 10-2021-0053330, filed on Apr. 23, 2021, the entire contents of which is incorporated herein for all purposes by this reference.

BACKGROUND OF THE INVENTION

Field of the Invention

The present invention relates to a lane keeping control apparatus, a system including the same, and a method thereof, and more particularly, relates to technologies of performing lane keeping control with regard to a steering time delay.

Description of Related Art

Various systems for safe driving have been applied to vehicles recently produced or have been in development for application. One of them is a lane keeping control system for performing driving control to keep the line to prevent the vehicle from departing from the line, when the vehicle departs from the line due to careless driving of a driver.

Such a lane keeping control system generates the center portion of the lane as a target path and controls such that the vehicle follows the target path, which performs a steering wheel alignment command after the vehicle arrives at the target path.

Each of existing vehicles performs a steering wheel alignment command, after the vehicle arrives at the target path upon lane keeping control. As a time delay occurs to actually align the vehicle because a steering system response is slow, as a result, steering oscillation of the vehicle occurs.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a lane keeping control apparatus for generating compensation steering (counter steering) based on a current yaw rate with regard to a steering time delay of the vehicle before the vehicle arrives at the target path during lane keeping control and aligning the vehicle to minimize steering oscillation of the vehicle, a vehicle system including the same, and a method thereof.

The technical problems to be solved by the present invention are not limited to the aforementioned problems, and any other technical problems not mentioned herein will be clearly understood from the following description by those skilled in the art to which various exemplary embodiments of the present invention pertains.

According to various aspects of the present invention, a lane keeping control apparatus may include a processor that generates a target path based on line information, upon lane keeping control of the vehicle, determines whether a vehicle arrives near the target path, determines a feedback compensation distance in a direction opposite to a current steering direction of the vehicle based on a yaw rate of the vehicle, when the vehicle arrives adjacent to the target path, and performs steering control of the vehicle based on the feedback compensation distance and a storage storing data and an algorithm run by the processor.

In various exemplary embodiments of the present invention, the processor may determine whether the vehicle arrives adjacent to the target path using a heading angle of the vehicle and a vehicle offset of the vehicle with respect to the target path.

In various exemplary embodiments of the present invention, the processor may determine the feedback compensation distance, when the processor concludes that the heading angle of the vehicle is less than or equal to a predetermined first threshold or that the vehicle offset is less than or equal to a predetermined second threshold.

In various exemplary embodiments of the present invention, the processor may multiply the yaw rate by a change value of a time until arriving at a look-ahead distance to determine a yaw angle and may determine the feedback compensation distance using the yaw rate and the look-ahead distance.

In various exemplary embodiments of the present invention, the processor may add a vehicle offset of the vehicle from the target path to the feedback compensation distance to determine a final target movement lateral distance.

In various exemplary embodiments of the present invention, the processor may determine a final target movement lateral distance using a vehicle offset of the vehicle from the target path, when the processor concludes that the heading angle of the vehicle is greater than the predetermined first threshold or when the processor concludes that the vehicle offset is greater than the predetermined second threshold.

In various exemplary embodiments of the present invention, the processor may perform steering wheel alignment of the vehicle in advance, when the vehicle arrives near the target path.

According to various aspects of the present invention, a vehicle system may include a sensing device that obtains line information in front of a vehicle and a yaw rate and a lane keeping control apparatus that generates a target path based on the line information obtained from the sensing device, upon lane keeping control of the vehicle, determines whether the vehicle arrives adjacent to the target path, and determines a feedback compensation distance in a direction opposite to a current steering direction of the vehicle based on the yaw rate, when the vehicle arrives adjacent to the target path, and perform steering control of the vehicle according to the feedback compensation distance.

In various exemplary embodiments of the present invention, the lane keeping control apparatus may determine whether the vehicle arrives adjacent to the target path using a heading angle of the vehicle and a vehicle offset of the vehicle with respect to the target path.

In various exemplary embodiments of the present invention, the lane keeping control apparatus may determine the feedback compensation distance, when the processor concludes that the heading angle of the vehicle is less than or equal to a predetermined first threshold or that the vehicle offset is less than or equal to a predetermined second threshold.

In various exemplary embodiments of the present invention, the lane keeping control apparatus may multiply the yaw rate by a change value of a time until arriving at a look-ahead distance to determine a yaw angle and may determine the feedback compensation distance using the yaw rate and the look-ahead distance.

In various exemplary embodiments of the present invention, the lane keeping control apparatus may add a vehicle offset of the vehicle from the target path to the feedback compensation distance to determine a final target movement lateral distance.

In various exemplary embodiments of the present invention, the lane keeping control apparatus may determine a final target movement lateral distance using a vehicle offset of the vehicle from the target path, when the processor concludes that the heading angle of the vehicle is greater than the predetermined first threshold or when the processor concludes that the vehicle offset is greater than the predetermined second threshold.

In various exemplary embodiments of the present invention, the lane keeping control apparatus may perform steering wheel alignment of the vehicle in advance, when the vehicle arrives near the target path.

According to various aspects of the present invention, a lane keeping control method may include obtaining line information in front of a vehicle and a yaw rate, generating a target path based on the line information, upon lane keeping control of the vehicle, determining whether the vehicle arrives adjacent to the target path, determining a feedback compensation distance in a direction opposite to a current steering direction of the vehicle based on the yaw rate, when the vehicle arrives adjacent to the target path, and performing steering control of the vehicle according to the feedback compensation distance.

In various exemplary embodiments of the present invention, the determining of whether the vehicle arrives adjacent to the target may include determining whether the vehicle arrives adjacent to the target path using a heading angle of the vehicle and a vehicle offset of the vehicle with respect to the target path.

In various exemplary embodiments of the present invention, the determining of whether the vehicle arrives adjacent to the target may include determining that the vehicle arrives adjacent to the target path, when the processor concludes that the heading angle of the vehicle is less than or equal to a predetermined first threshold or that the vehicle offset is less than or equal to a predetermined second threshold.

In various exemplary embodiments of the present invention, the determining of the feedback compensation distance may include multiplying the yaw rate by a change value of a time until arriving at a look-ahead distance to determine a yaw angle and determining the feedback compensation distance using the yaw rate and the look-ahead distance.

In various exemplary embodiments of the present invention, the determining of the feedback compensation distance may further include adding a vehicle offset of the vehicle from the target path to the feedback compensation distance to determine a final target movement lateral distance.

In various exemplary embodiments of the present invention, the lane keeping control method may further include determining the final target movement lateral distance using the vehicle offset from the target path, when a heading angle of the vehicle is greater than a predetermined first threshold or when the vehicle offset is greater than a predetermined second threshold.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
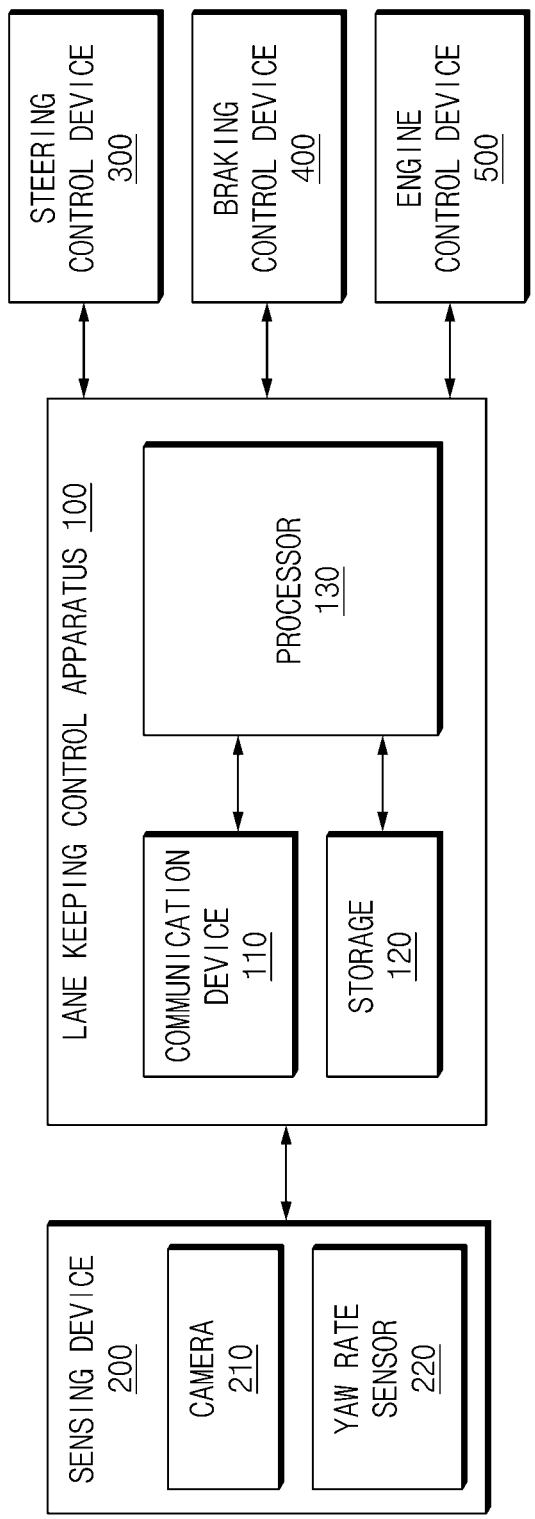
FIG. 1 is a block diagram illustrating a configuration of a vehicle system including a lane keeping control apparatus according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIG. 1, FIG. 2, FIG. 3, FIG. 4, FIG. 5, FIG. 6, FIG. 7, FIG. 8 and FIG. 9.

FIG. 1 is a block diagram illustrating a configuration of a vehicle system including a lane keeping control apparatus according to various exemplary embodiments of the present invention.

Referring to FIG. 1, the vehicle system according to various exemplary embodiments of the present invention may include a lane keeping control apparatus 100, a sensing device 200, a steering control device 300, a braking control device 400, and an engine control device 500.

The lane keeping control apparatus 100 according to various exemplary embodiments of the present invention may be implemented in a vehicle. In the instant case, the lane keeping control apparatus 100 may be integrally configured with control units in the vehicle or may be implemented as a separate device to be connected to the control units of the vehicle by a separate connection means. The lane keeping control apparatus 100 may be implemented as lane following assist (LFA), lane departure warning (LDW), lane keeping system (LKS), lane keeping assistance system (LKAS), or the like.

The lane keeping control apparatus 100 may generate a target path based on line information, upon lane keeping control of the vehicle, may determine a feedback compensation distance in a direction opposite to a current steering direction of the vehicle based on a yaw rate of the vehicle, when the vehicle arrives near the target path, and may perform steering control of the vehicle according to the feedback compensation distance.

Referring to FIG. 1, the lane keeping control apparatus 100 may include a communication device 110, a storage 120, and a processor 130.

The communication device 110 may be a hardware device implemented with various electronic circuits to transmit and receive a signal through a wireless or wired connection, which may transmit and receive information with devices in the vehicle based on a network communication technology in the vehicle. As an example, the network communication technology in the vehicle may include controller area network (CAN) communication, Local Interconnect Network (LIN) communication, flex-ray communication, or the like.

As an example, the communication device 110 may perform communication with the devices in the vehicle and may receive a sensing result from the sensing device 200. The communication device 110 may receive a distance error to a lane center on a look-ahead distance from a camera 210.

The storage 120 may store a detecting result of the sensing device 200 and data, algorithms, and/or the like necessary for an operation of the processor 130. As an example, the storage 120 may store line information (e.g., a heading angle, an offset, or the like) received from the sensing device 200 and a yaw rate, and may store a yaw angle, a look-ahead distance, a feedback compensation distance, or the like determined by the processor 130.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected to the communication device 110, the storage 120, or the like and may electrically control the respective components. The processor 130 may be an electrical circuit which executes instructions of software and may perform a variety of data processing and determination described below.

The processor 130 may process a signal delivered between the respective components of the lane keeping control apparatus 100. The processor 130 may be, for example, an electronic control unit (ECU), a micro controller unit (MCU), or another sub-controller, which is loaded into the vehicle.

The processor 130 may receive line information (e.g., a vehicle heading angle, an offset from a lane center, or the like) from the camera 210 and may receive a yaw rate value from a yaw rate sensor 220.

The processor 130 may generate a target path based on line information, upon lane keeping control of the vehicle, may determine a feedback compensation distance in a direction opposite to a current steering direction of the vehicle based on a yaw rate of the vehicle, when the vehicle arrives near the target path, and may perform steering control of the vehicle according to the feedback compensation distance.

The processor 130 may determine whether the vehicle arrives near the target path using a heading angle of the vehicle and a vehicle offset of the vehicle with respect to the target path.

In other words, when the heading angle of the vehicle is less than or equal to a predetermined first threshold and when the vehicle offset is less than or equal to a predetermined second threshold, the processor 130 may determine the feedback compensation distance.

Figure 2A:
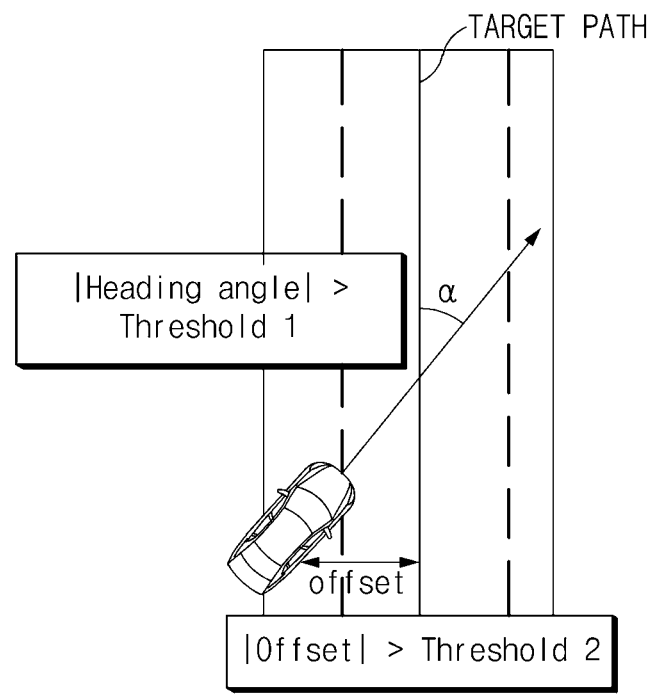
FIG. 2A and FIG. 2B are drawings illustrating a yaw rate feedback trigger condition according to various exemplary embodiments of the present invention.
Figure 2B:
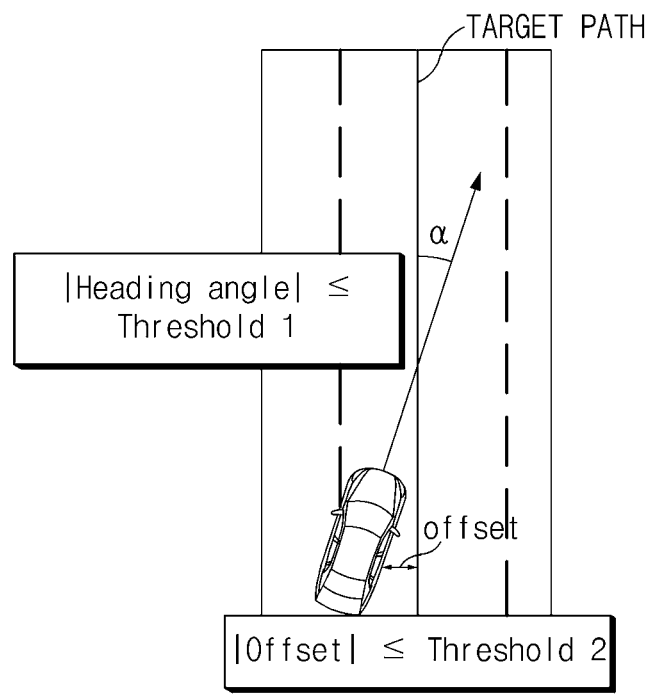

In an exemplary embodiment of the present invention, the vehicle offset is a distance between the vehicle and the target path and is measured in a perpendicular direction to the target path FIG. 2A and FIG. 2B are drawings illustrating a yaw rate feedback trigger condition according to various exemplary embodiments of the present invention. Herein, the yaw rate feedback trigger condition is a condition of determining whether the vehicle arrives near a target path.

Referring to FIG. 2A, when the vehicle heading angle α is greater than a first threshold Threshold 1 or when the vehicle offset is greater than a second threshold Threshold 2, a processor 130 of FIG. 1 does not apply feedback compensation control based on a yaw rate. Referring to FIG. 2B, when the vehicle heading angle α is less than or equal to the first threshold Threshold 1 or when the vehicle offset is less than or equal to the second threshold Threshold 2, the processor 130 applies the feedback compensation control based on the yaw rate.

The processor 130 may multiply a yaw rate by a change value of a time until arriving at a look-ahead distance to determine a yaw angle and may determine a feedback compensation distance using the yaw angle and the look-ahead distance. Furthermore, the processor 130 may add a vehicle offset from a target path to the feedback compensation distance to determine a final target movement lateral distance.

Figure 3:
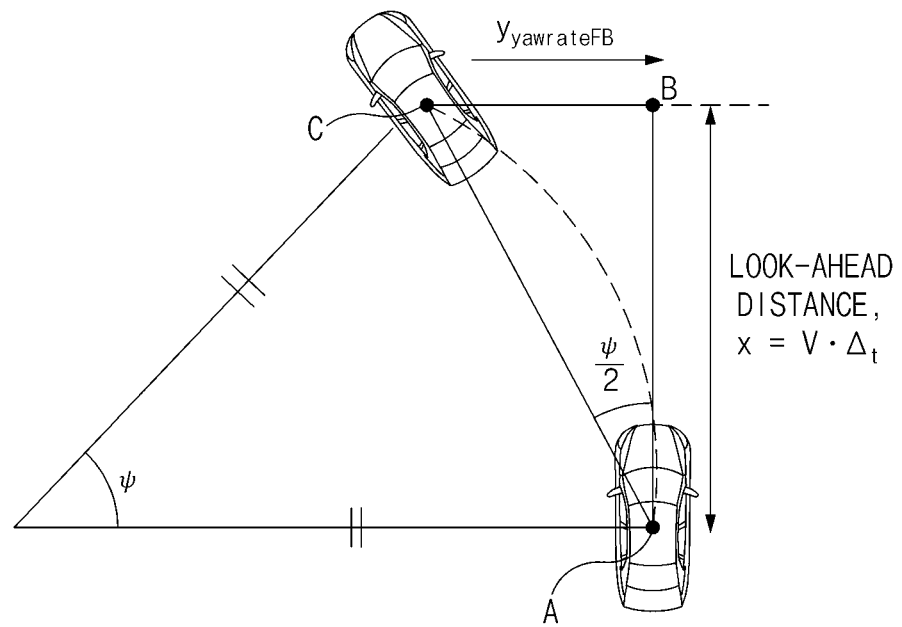
FIG. 3 is a drawing illustrating a process of determining a yaw rate feedback compensation distance in a lane keeping control apparatus according to various exemplary embodiments of the present invention.

FIG. 3 is a drawing illustrating a process of determining a yaw rate feedback compensation distance in a lane keeping control apparatus according to various exemplary embodiments of the present invention.

Referring to FIG. 3, a lane keeping control apparatus 100 of FIG. 1 may multiply a current yaw rate of the vehicle, which is received from a yaw rate sensor 220 of FIG. 1, by a time to determine a yaw angle ψ.

When the current distance of the vehicle is A, when the end point of the look-ahead distance x is B, and when the point at which the vehicle will arrive depending on steering control is C, CAB is $$\frac{\psi}{2}.$$

Next, the lane keeping control apparatus 100 may multiply a value obtained by dividing the yaw angle ψ by 2 by a correction coefficient K and a look-ahead distance x and may add a minus (−) sign to the value to determine a feedback compensation distance $y_{yawrateFB}$.

$$y_{yawrateFB} = -K\frac{\psi}{2}x = -K\left(\frac{\dot{\psi}}{2}\Delta_t\right)x \quad \text{[Equation 1]}$$

Herein, ψ refers to the yaw angle, K refers to the correction coefficient, x refers to the look-ahead distance, and $\Delta_t$ refers to the change in time to the look-ahead distance. In the instant case, $y_{yawrateFB}$ may be determined as tan $$\left(\frac{\psi}{2}\right)x.$$

When ψ is very small value, tan $$\left(\frac{\psi}{2}\right)x$$

may be approximated to $$\left(\frac{\psi}{2}\right)x.$$

Accordingly, the processor 130 may determine that the vehicle arrives near a target path, when the heading angle of the vehicle is less than or equal to a predetermined first threshold and when the vehicle offset is less than or equal to a predetermined second threshold, may determine a feedback compensation distance based on a current yaw rate of the vehicle, and may add the vehicle offset to the feedback compensation distance to determine a final target movement lateral distance, thus performing vehicle control depending on the final target movement lateral distance. In the instant case, because the feedback compensation distance has a direction opposite to the yaw rate of the vehicle, as the steering of the vehicle is compensated, steering wheel alignment may be performance in advance before the vehicle arrives at the target path.

On the other hand, when the heading angle of the vehicle is greater than the predetermined first threshold or when the vehicle offset is greater than the predetermined second threshold, the processor 130 may determine a final movement lateral distance using only the vehicle offset from the target path, without determining a feedback compensation distance.

A sensing device 200 of FIG. 1 may include a camera 210 for obtaining line information, a yaw rate sensor 220 for detecting a yaw rate of the vehicle, or the like. In the instant case, the camera 210 may capture an image in front of the vehicle to obtain line information.

A steering control device 300 of FIG. 1 may be configured to control a steering angle of the vehicle and may include a steering wheel, an actuator interlocked with the steering wheel, and a controller configured for controlling the actuator.

A braking control device 400 of FIG. 1 may be configured to control braking of the vehicle and may include a controller configured for controlling a brake.

The engine control device 500 may be configured to control to drive an engine of the vehicle and may include a controller configured for controlling a speed of the vehicle.

Figure 4:
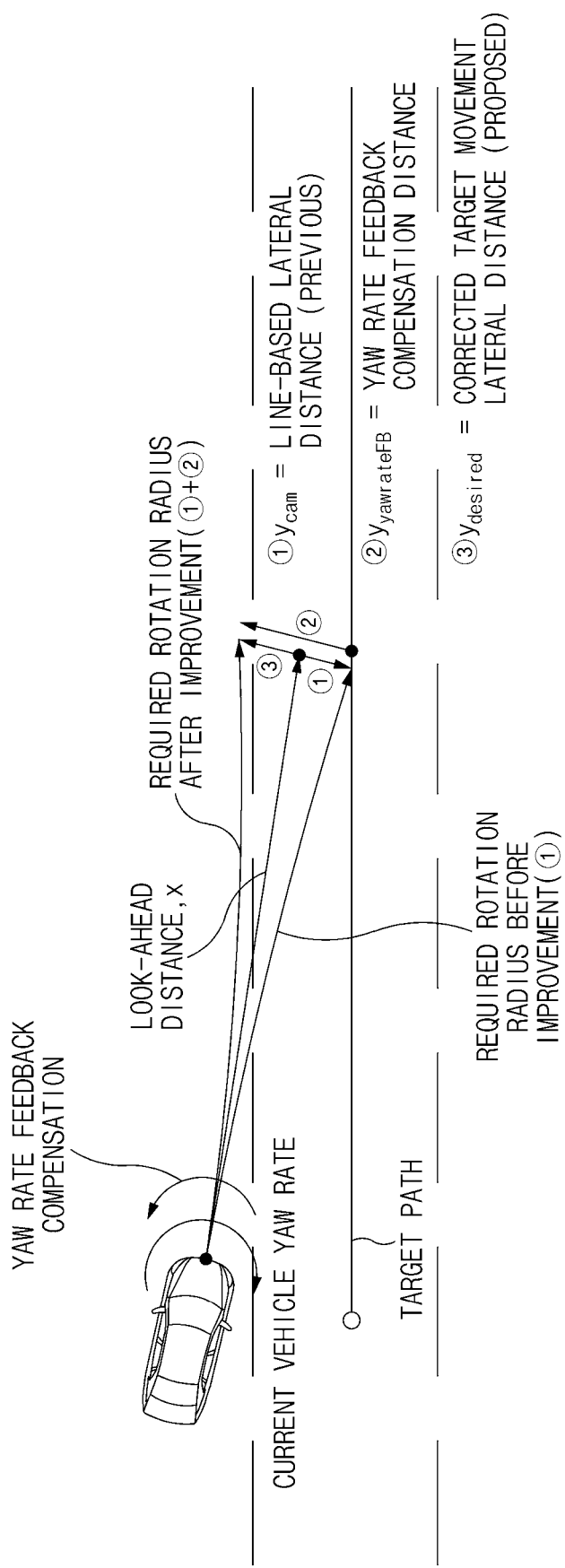
FIG. 4 is a conceptual diagram illustrating a process of determining a target movement lateral distance in a lane keeping control apparatus according to various exemplary embodiments of the present invention.

FIG. 4 is a conceptual diagram illustrating a process of determining a target movement lateral distance in a lane keeping control apparatus according to various exemplary embodiments of the present invention.

Referring to FIG. 4, a lane keeping control apparatus 100 of FIG. 1 may set a target path based on line information received from a camera 210 of FIG. 1 and may generate and apply compensation steering (or counter steering or an opposite sign of the current yaw rate) for offsetting the current yaw rate of the vehicle, when the vehicle is close near the target path, thus advancing a steering wheel alignment time.

In FIG. 4, □ is the line-based lateral distance, which corresponds to the vehicle offset. □ is the yaw rate-based feedback compensation distance $y_{yawrateFB}$, and □ is the corrected final target movement lateral distance.

In other words, in an existing technology, steering control is performed such that the vehicle moves by the line-based lateral distance □ such that the vehicle arrives at the target path.

The lane keeping control apparatus 100 may add the line-based lateral distance □ for arriving at the target path to the yaw rate-based feedback compensation distance □ for vehicle alignment based on a current yaw rate to determine the corrected final target movement lateral distance □, thus controlling such that the vehicle moves by the final target movement lateral distance.

Figure 5:
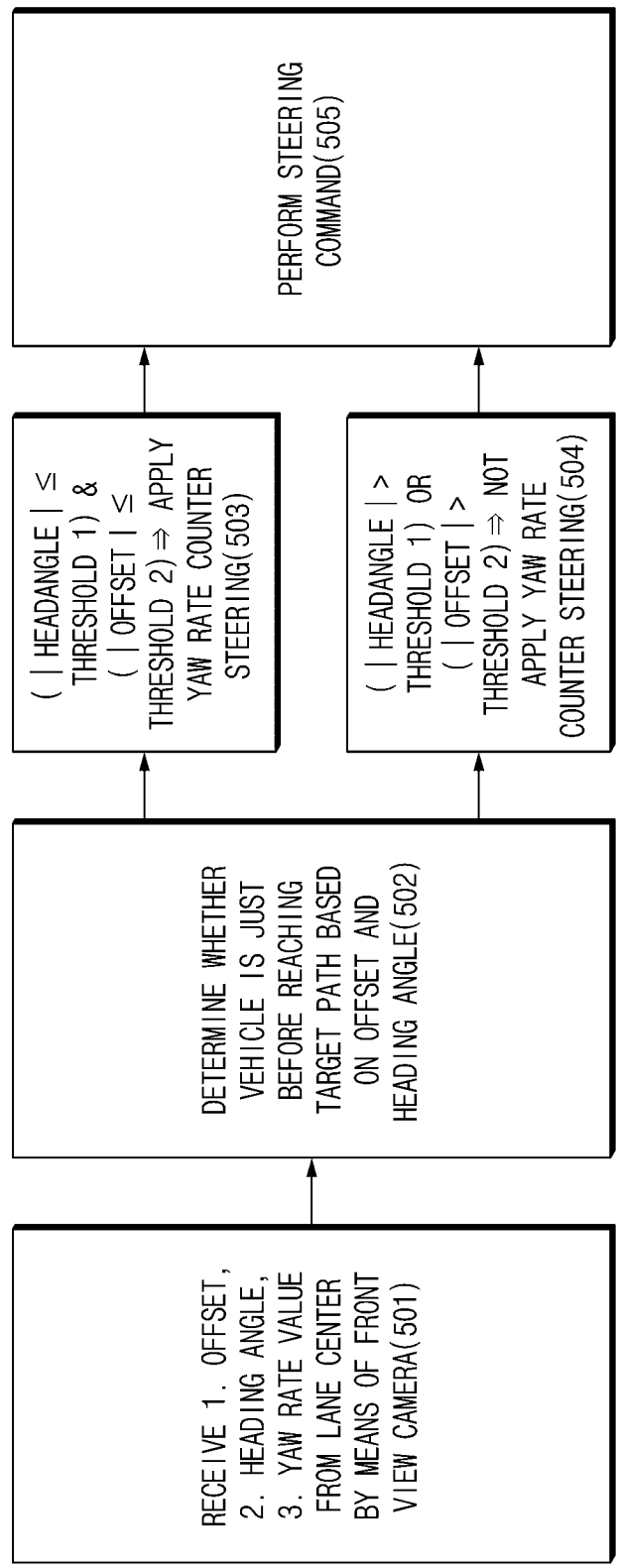
FIG. 5 is a drawing illustrating a lane keeping control flow according to various exemplary embodiments of the present invention.

FIG. 5 is a drawing illustrating a lane keeping control flow according to various exemplary embodiments of the present invention.

Referring to FIG. 5, in operation 501, a lane keeping control apparatus 100 of FIG. 1 may extract an offset and a heading angle of a vehicle from a lane center (i.e., a target path), and a yaw rate value based on line information received by a front view camera.

In operation 502, the lane keeping control apparatus 100 may determine whether the vehicle is just before reaching the target path, based on the offset and the heading angle of the vehicle.

In operation 503, when the heading angle of the vehicle is less than or equal to a predetermined first threshold and when the offset is less than or equal to a predetermined second threshold, the lane keeping control apparatus 100 may execute yaw rate counter steering (compensation steering). In other words, when the heading angle of the vehicle is less than or equal to the first threshold and when the offset is less than or equal to the predetermined second threshold, the lane keeping control apparatus 100 may determine that the vehicle arrives near a target path and may execute counter steering control, thus advancing a steering wheel alignment time.

Meanwhile, in operation 504, when the heading angle of the vehicle is greater than the predetermined first threshold or when the offset is greater than the predetermined second threshold, the lane keeping control apparatus 100 may fail to execute yaw rate counter steering (compensation steering).

In operation 505, the lane keeping control apparatus 100 may perform steering by applying or not applying the counter steering depending on the heading angle of the vehicle and the offset before the vehicle arrives at the target path.

Figure 6:
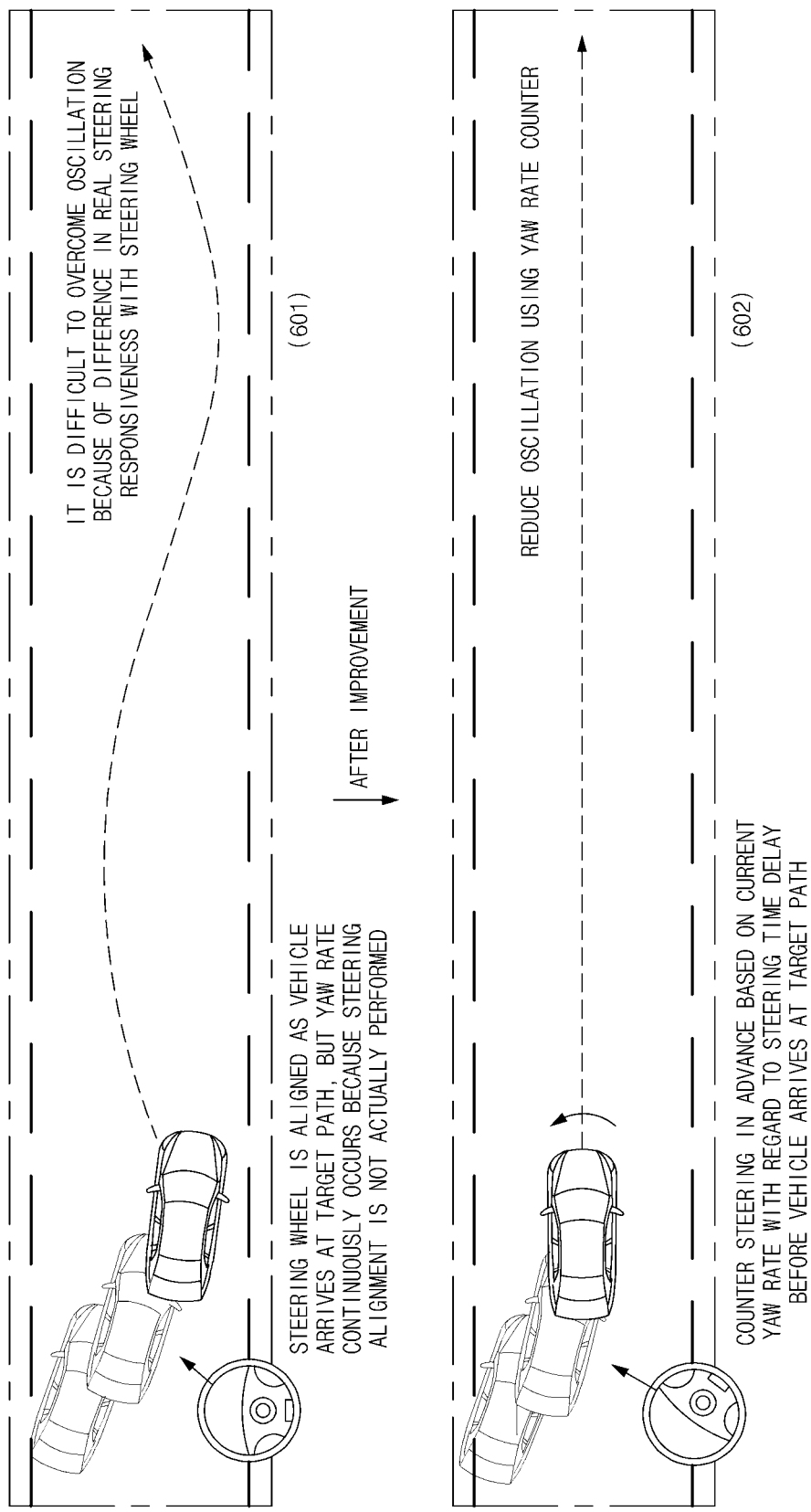
FIG. 6 is a drawing illustrating comparing a steering oscillation result of a lane keeping control apparatus with existing steering oscillation result according to various exemplary embodiments of the present invention.

FIG. 6 is a drawing illustrating comparing a steering oscillation result of a lane keeping control apparatus with existing steering oscillation result according to various exemplary embodiments of the present invention.

Referring to reference numeral 601 of FIG. 6, it may be seen that, because steering alignment is not actually performed when the steering wheel is aligned after the vehicle arrives at the target path, oscillation of the vehicle occurs as a yaw rate is continuously generated.

Like reference numeral 602, it may be seen that oscillation of the vehicle is minimized by yaw rate-based counter steering of the vehicle with regard to a steering time delay immediately before the vehicle arrives at the target path.

Figure 7:
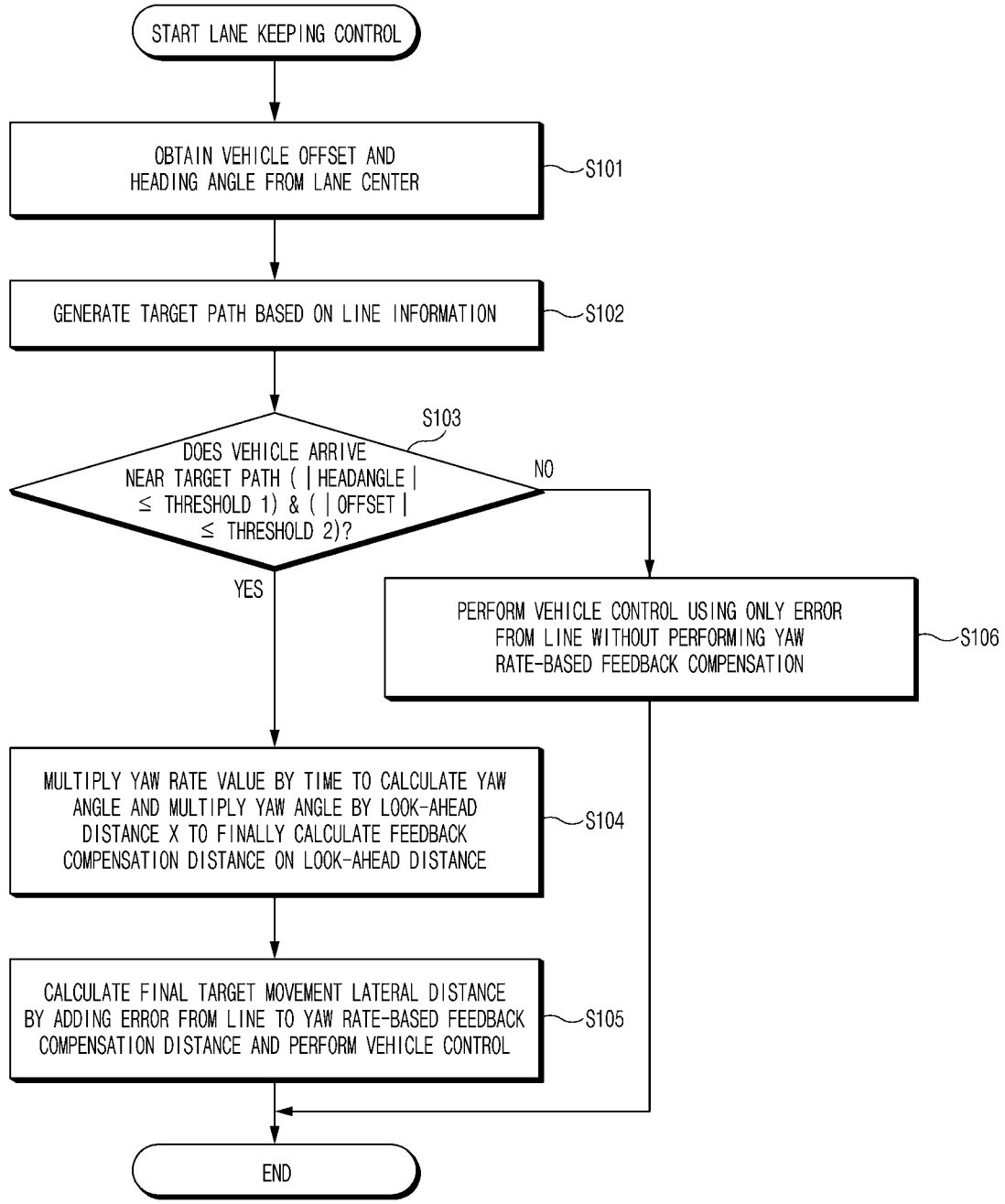
FIG. 7 is a flowchart illustrating a lane keeping control method with regard to a steering time delay according to various exemplary embodiments of the present invention.

Hereinafter, a description will be provided in detail of a lane keeping control method according to various exemplary embodiments of the present invention with reference to FIG. 7. FIG. 7 is a flowchart illustrating a lane keeping control method based on yaw rate feedback according to various exemplary embodiments of the present invention.

Hereinafter, it is assumed that a lane keeping control apparatus 100 of FIG. 1 performs a process of FIG. 7. Furthermore, in a description of FIG. 7, an operation referred to as being performed by a lane keeping control apparatus 100 may be understood as being controlled by a processor 130 of the lane keeping control apparatus 100.

Referring to FIG. 7, in S101, the lane keeping control apparatus 100 may receive line information and a yaw rate value from a sensing device 200 of FIG. 1. In the instant case, the line information may include information related to the line of the lane, a vehicle offset and a heading angle from a lane center, or the like.

In S102, the lane keeping control apparatus 100 may generate a target path based on the received line information.

In S103, the lane keeping control apparatus 100 may determine whether the vehicle arrives near the target path. In other words, when the heading angle of the vehicle is less than or equal to a predetermined first threshold and when the offset is less than or equal to a predetermined second threshold, the lane keeping control apparatus 100 may determine that the vehicle arrives near the target path. In the instant case, the offset may be a distance between the target path and the vehicle, which may refer to a distance from a lane center to the vehicle, when the target path is the lane center.

When it is determined that the vehicle arrives near the target path, in S104, the lane keeping control apparatus 100 may multiply a yaw rate value of the vehicle by a time to determine a yaw angle and may multiply the yaw angle by a look-ahead distance x to finally determine a feedback compensation distance $y_{yawrateFB}$ on the look-ahead distance.

In S105, the lane keeping control apparatus 100 may add the offset of the vehicle, that is, an error from the line to the yaw rate-based feedback compensation distance $y_{yawrateFB}$ to determine a final target movement distance and may perform vehicle control depending on the final target movement distance.

Meanwhile, when the vehicle does not arrive near the target path, in S106, the lane keeping control apparatus 100 may perform vehicle control using by applying only the vehicle offset, that is, the error from the line without performing yaw rate-based feedback compensation.

Figure 8:
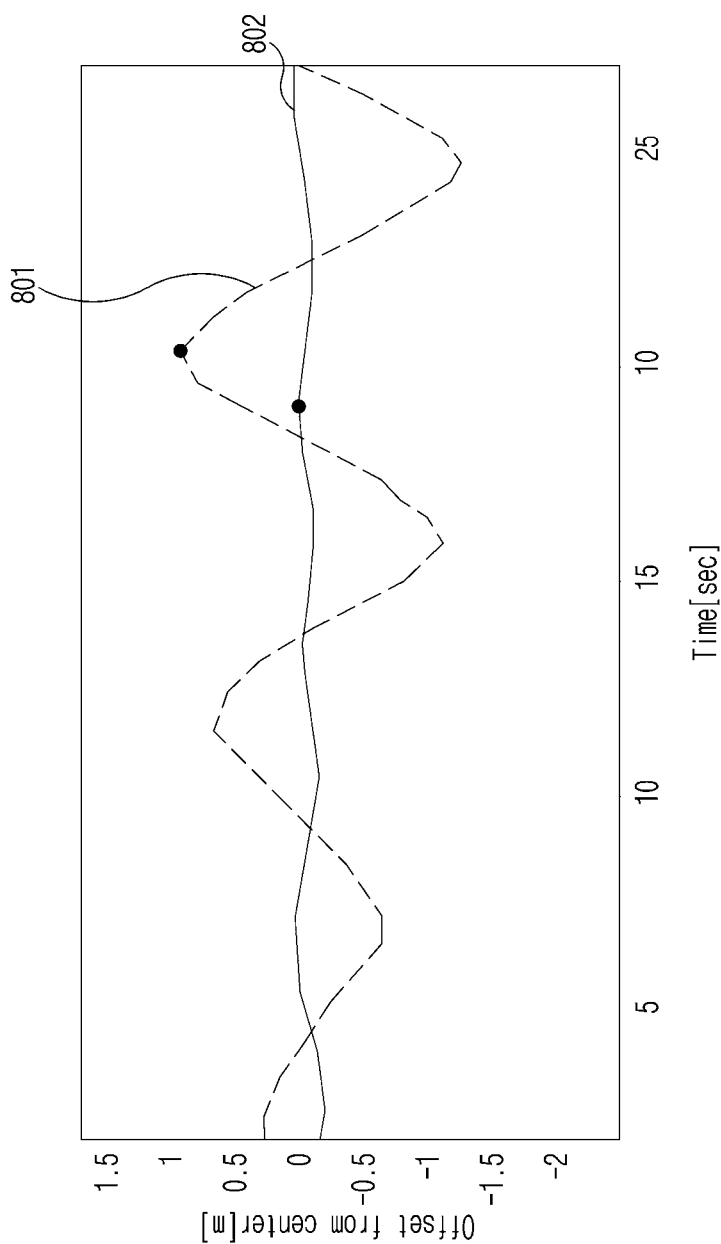
FIG. 8 is a drawing illustrating a lane keeping control effect with regard to a steering time delay according to various exemplary embodiments of the present invention.

FIG. 8 is a drawing illustrating a lane keeping control effect with regard to a steering time delay according to various exemplary embodiments of the present invention.

Referring to FIG. 8, upon steering control of a vehicle based on a vehicle offset, like reference numeral 801, it may be seen that oscillation is severe. However, by performing the vehicle offset and the yaw rate-based feedback compensation control together according to various exemplary embodiments of the present invention, like reference numeral 802, it may be seen that oscillation of the vehicle is minimized.

Figure 9:
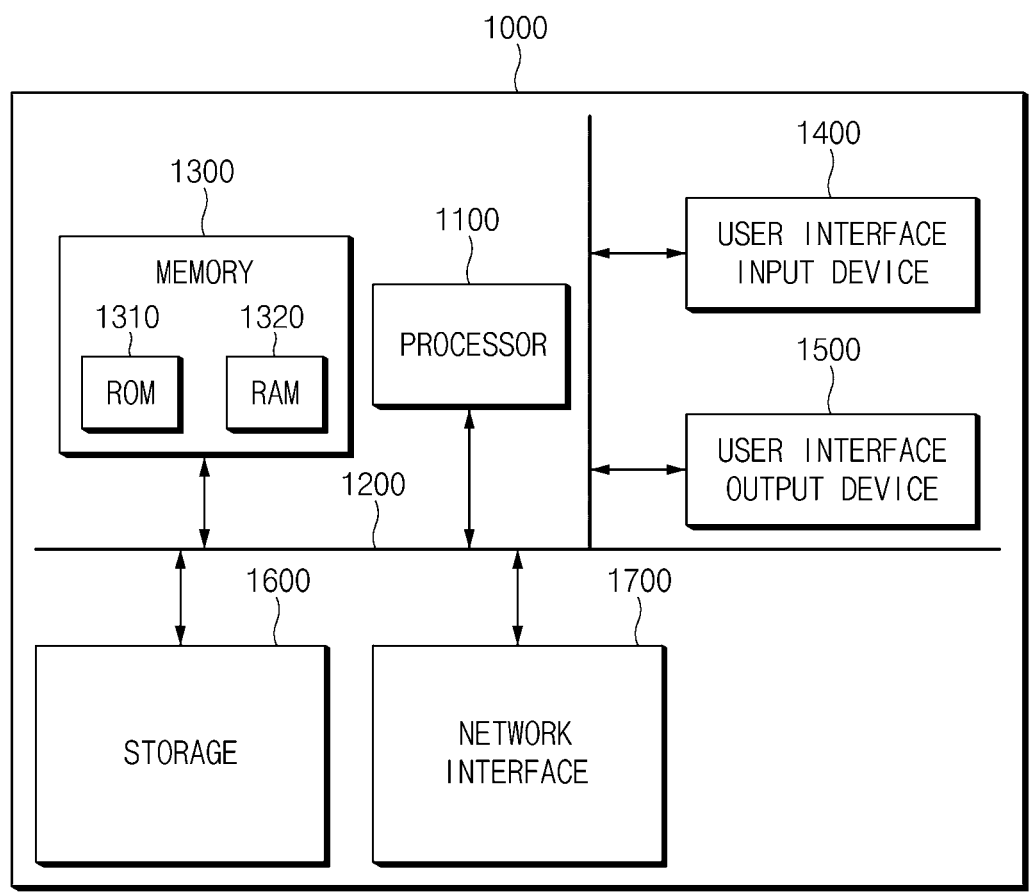
FIG. 9 is a block diagram illustrating a computing system according to various exemplary embodiments of the present invention.

FIG. 9 is a block diagram illustrating a computing system according to various exemplary embodiments of the present invention.

Referring to FIG. 9, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may generate compensation steering (counter steering) based on a current yaw rate with regard to a steering time delay of the vehicle before the vehicle arrives at the target path during lane keeping control and may align the vehicle, thus minimizing steering oscillation of the vehicle.

Furthermore, various effects ascertained directly or indirectly through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lane keeping control apparatus comprising:
   a processor configured to generate a target path of a vehicle based on line information, upon lane keeping control of the vehicle, to determine whether the vehicle arrives adjacent to the target path, to determine a feedback compensation distance in a direction opposite to a current steering direction of the vehicle based on a yaw rate of the vehicle, when the vehicle arrives adjacent to the target path before the vehicle arrives at the target path, and to perform steering control of the vehicle based on the feedback compensation distance; and
   a storage storing data and an algorithm run by the processor.

2. The lane keeping control apparatus of claim 1, wherein the processor is configured to determine whether the vehicle arrives adjacent to the target path using a heading angle of the vehicle and a vehicle offset of the vehicle with respect to the target path.

3. The lane keeping control apparatus of claim 2, wherein the processor is configured to determine the feedback compensation distance, when the processor concludes that the heading angle of the vehicle is less than or equal to a predetermined first threshold or that the vehicle offset is less than or equal to a predetermined second threshold.

4. The lane keeping control apparatus of claim 3, wherein the processor is configured to determine a final target movement lateral distance using a vehicle offset of the vehicle from the target path, when the processor concludes that the heading angle of the vehicle is greater than the predetermined first threshold or when the processor concludes that the vehicle offset is greater than the predetermined second threshold.

5. The lane keeping control apparatus of claim 1, wherein the processor is configured to multiply the yaw rate by a change value of a time until arriving at a look-ahead distance to determine a yaw angle and to determine the feedback compensation distance using the yaw rate and the look-ahead distance.

6. The lane keeping control apparatus of claim 1, wherein the processor is configured to add a vehicle offset of the vehicle from the target path to the feedback compensation distance to determine a final target movement lateral distance.

7. The lane keeping control apparatus of claim 1, wherein the processor is configured to perform steering wheel alignment of the vehicle in advance, when the vehicle arrives near the target path.

8. A vehicle system comprising:
   a sensing device configured to obtain line information in front of a vehicle and a yaw rate of the vehicle; and
   a lane keeping control apparatus including a processor and configured to generate a target path based on the line information obtained from the sensing device, upon lane keeping control of the vehicle, to determine whether the vehicle arrives adjacent to the target path, and to determine a feedback compensation distance in a direction opposite to a current steering direction of the vehicle based on the yaw rate, when the vehicle arrives adjacent to the target path before the vehicle arrives at the target path, and to perform steering control of the vehicle according to the feedback compensation distance.

9. The vehicle system of claim 8, wherein the lane keeping control apparatus is configured to determine whether the vehicle arrives adjacent to the target path using a heading angle of the vehicle and a vehicle offset of the vehicle with respect to the target path.

10. The vehicle system of claim 9, wherein the lane keeping control apparatus is configured to determine the feedback compensation distance, when the processor concludes that the heading angle of the vehicle is less than or equal to a predetermined first threshold or that the vehicle offset is less than or equal to a predetermined second threshold.

11. The vehicle system of claim 10, wherein the lane keeping control apparatus is configured to determine a final target movement lateral distance using a vehicle offset of the vehicle from the target path, when the processor concludes that the heading angle of the vehicle is greater than the predetermined first threshold or when the processor concludes that the vehicle offset is greater than the predetermined second threshold.

12. The vehicle system of claim 8, wherein the lane keeping control apparatus is configured to multiply the yaw rate by a change value of a time until arriving at a look-ahead distance to determine a yaw angle and is configured to determine the feedback compensation distance using the yaw rate and the look-ahead distance.

13. The vehicle system of claim 8, wherein the lane keeping control apparatus is configured to add a vehicle offset of the vehicle from the target path to the feedback compensation distance to determine a final target movement lateral distance.

14. The vehicle system of claim 8, wherein the lane keeping control apparatus is configured to perform steering wheel alignment of the vehicle in advance, when the vehicle arrives near the target path.

15. A lane keeping control method comprising:
   obtaining, by a processor, line information in front of a vehicle and a yaw rate of the vehicle;
   generating, by the processor, a target path based on the line information, upon lane keeping control of the vehicle;
   determining, by the processor, whether the vehicle arrives adjacent to the target path;
   determining, by the processor, a feedback compensation distance in a direction opposite to a current steering direction of the vehicle based on the yaw rate, before the vehicle arrives at the target path when the vehicle arrives adjacent to the target path; and
   performing, by the processor, steering control of the vehicle according to the feedback compensation distance.

16. The lane keeping control method of claim 15, wherein the determining of whether the vehicle arrives adjacent to the target includes:
   determining whether the vehicle arrives adjacent to the target path using a heading angle of the vehicle and a vehicle offset of the vehicle with respect to the target path.

17. The lane keeping control method of claim 16, wherein the determining of whether the vehicle arrives adjacent to the target includes:
   determining that the vehicle arrives adjacent to the target path, when the processor concludes that the heading angle of the vehicle is less than or equal to a predetermined first threshold or that the vehicle offset is less than or equal to a predetermined second threshold.

18. The lane keeping control method of claim 15, wherein the determining of the feedback compensation distance includes:
   multiplying the yaw rate by a change value of a time until arriving at a look-ahead distance to determine a yaw angle and determining the feedback compensation distance using the yaw rate and the look-ahead distance.

19. The lane keeping control method of claim 18, wherein the determining of the feedback compensation distance further includes:
   adding a vehicle offset of the vehicle from the target path to the feedback compensation distance to determine a final target movement lateral distance.

20. The lane keeping control method of claim 19, further including:
   determining the final target movement lateral distance using the vehicle offset from the target path, when the processor concludes that a heading angle of the vehicle is greater than a predetermined first threshold or when the processor concludes that the vehicle offset is greater than a predetermined second threshold.

* * * * *